US012746812B2

(12) United States Patent
Yoon et al.

(10) Patent No.: US 12,746,812 B2
(45) Date of Patent: Sep. 29, 2026

(54) EXTERNAL VARIABLE OPENING AND CLOSING APPARATUS

(71) Applicants: Hyundai Motor Company, Seoul (KR); Kia Corporation, Seoul (KR); HYUNDAI MOBIS CO., LTD., Seoul (KR)

(72) Inventors: Jin Young Yoon, Gimpo-si (KR); Dong Eun Cha, Hwaseong-si (KR); Hong Heui Lee, Suwon-si (KR); Jae Sup Byun, eongnam-si (KR); Jang Ho Kim, Seoul (KR)

(73) Assignees: HYUNDAI MOTOR COMPANY, Seoul (KR); KIA CORPORATION, Seoul (KR); HYUNDAI MOBIS CO., LTD., Seoul (KR)

(*) Notice: Subject to any disclaimer, the term of this patent is extended or adjusted under 35 U.S.C. 154(b) by 257 days.

(21) Appl. No.: 18/654,504

(22) Filed: May 3, 2024

(65) Prior Publication Data

US 2025/0196618 A1 Jun. 19, 2025

(30) Foreign Application Priority Data

Dec. 18, 2023 (KR) ........................ 10-2023-0184693

(51) Int. Cl.
*B60K 11/08* (2006.01)
*B60Q 1/28* (2006.01)

(52) U.S. Cl.
CPC .............. *B60K 11/085* (2013.01); *B60Q 1/28* (2013.01)

(58) Field of Classification Search
CPC ................................ B60K 11/085; B60Q 1/28
See application file for complete search history.

(56) References Cited

U.S. PATENT DOCUMENTS

| | | | | |
|---|---|---|---|---|
| 8,550,887 B2 | 10/2013 | Walters | | |
| 2013/0068403 A1* | 3/2013 | Fenchak .............. | B60K 11/085 160/218 |
| 2021/0001928 A1* | 1/2021 | Solazzo ............... | B62D 35/005 |
| 2021/0031617 A1 | 2/2021 | Hayakawa et al. | |
| 2021/0261045 A1* | 8/2021 | Cha ...................... | B60K 11/085 |
| 2023/0202289 A1 | 6/2023 | Jeong et al. | |

FOREIGN PATENT DOCUMENTS

| | | |
|---|---|---|
| DE | 2018 211 996 A1 | 1/2020 |
| DE | 2020 209 963 A1 | 8/2021 |
| EP | 3 724 032 B1 | 7/2021 |
| EP | 4 389 520 A1 | 6/2024 |
| JP | 2021-154799 A | 10/2021 |
| KR | 10-2021-0033181 A | 3/2021 |
| WO | 2013/043815 A1 | 3/2013 |

OTHER PUBLICATIONS

Extended European Search Report issued on Jul. 23, 2025 in European Patent Application No. 24174721.1.

* cited by examiner

*Primary Examiner* — Edwin A Young
(74) *Attorney, Agent, or Firm* — Morgan, Lewis & Bockius LLP

(57) ABSTRACT

An external variable opening and closing apparatus includes a housing having an opening portion, a flap unit provided in the opening portion to open or close the opening portion according to a tilting position of the flap unit in tilting in the housing, and a drive unit including a driver and an actuating member, wherein the actuating member is movably engaged to the housing and the flap unit is connected to the actuating member so that a tilting position of the flap unit switches in response to activation of the driver.

20 Claims, 14 Drawing Sheets

EXTERNAL VARIABLE OPENING AND CLOSING APPARATUS

CROSS-REFERENCE TO RELATED APPLICATION

The present application claims priority to Korean Patent Application No. 10-2023-0184693, filed Dec. 18, 2023, the entire contents of which is incorporated herein for all purposes by this reference.

BACKGROUND OF THE PRESENT DISCLOSURE

Field of the Present Disclosure

The present disclosure relates to an external variable opening and closing apparatus that controls the airflow rate passing through the grille and enhances merchantability through sophisticated opening and closing operations during airflow rate control.

Description of Related Art

Generally, mobility requires cooling of the powertrain components and cooling system components. Accordingly, mobility includes a grille to allow air to flow through the front portion to cool the powertrain components and cooling system components.

In other words, during the mobility operation, the vehicle-induced airflow introduced through the grille passes through the powertrain components and cooling system components to cool each component through air and heat exchanges.

On the other hand, the powertrain and cooling system components in mobility need to attain a specific temperature range for optimal performance. However, the grille of the mobility remains open all the time to facilitate heat exchange between the powertrain and cooling system components and the outside air. In other words, the inflow of air may adversely affect power and fuel efficiency until the temperature of the powertrain components reaches the specific range during initial start-up. Furthermore, an excessive rise in airflow rate induced by the vehicle during high-speed driving of the mobility may elevate air resistance, leading to a reduction in fuel efficiency.

To address these issues, contemporary mobilities are provided with active air flaps. The active air flaps are installed on the grille and configured to open or close the grille, so air inflow is blocked when the flaps close the grille and air is allowed to enter through the grille when the flaps open the grille.

However, conventional active air flaps are configured so that a plurality of doors rotates through a complex linkage structure. As a result, the structure of active air flaps becomes more complex, weight increases, and larger motors are required to operate the plurality of doors and the linkage structure.

Furthermore, the conventional active air flaps simply perform the role of selectively controlling the airflow.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an external variable opening and closing apparatus that is configured to control the airflow rate passing through the grille and enhances merchantability through sophisticated opening and closing operations during airflow rate control.

According to an exemplary embodiment of the present disclosure, an external variable opening and closing apparatus includes a housing having an opening portion, a flap unit provided in the opening portion to open or close the opening portion according to a tilting position of the flap unit when tilting in the housing, and a drive unit including a driver and an actuating member, wherein the actuating member is movably engaged to the housing and the flap unit is connected to the actuating member so that the tilting position of the flap unit switches in response to activation of the driver.

The actuating member includes a plurality of guide holes with a straight or curved region, and the flap unit is connected to the guide hole to move along the guide hole.

The driver and the actuating member are connected through a link portion, the link portion includes a driving link and a driven link rotatably connected to each other, and the driving link is connected to the driver while the driven link is connected to the actuating member.

The flap unit includes a panel portion and a moving shaft, and the moving shaft is inserted into the guide hole.

A first end portion of the end portions of the moving shaft of the flap unit is inserted into the guide hole in the actuating member while a second end portion is rotatably connected to the housing.

The moving shaft includes a first-side center shaft portion and the-second-side center shaft portion spaced apart across the opening portion and rotatably connected to the housing and a rotating shaft portion spaced apart in the orthogonal direction from the first-side center shaft portion or the-second-side center shaft portion and inserted into the guide hole.

The panel portion is connected to the first-side center shaft portion and the-second-side center shaft portion and disposed in an orthogonal direction at a distance from the point where each center shaft portion is connected to the housing.

The guide hole in the actuating member includes a maintenance region and a tilting region. The maintenance region extends linearly in the moving direction of the actuating member while the tilting region extends diagonally from the maintenance region.

The position, angle, or shape of the tilting region are either the same across the guide holes or at least one of these features differs.

The tilting region is disposed at a greater distance outward or inward as the guide hole is positioned farther away from the center portion of the opening portion.

The actuating members and the flap units are divided into groups, and the actuating member in each group is connected to a single driver to operate simultaneously.

The actuating member and the flap unit are configured as a pair of groups disposed on either side of the opening portion, the drive unit further includes a pair of link portions connected to the actuating member in each group, and the pair of link portions is connected to the single driver.

A lighting unit provided in the housing, configured to emit light toward the opening portion, and selectively turned on according to whether the opening portion is opened or closed by the flap unit is further included.

On the other hand, according to another exemplary embodiment of the present disclosure, an external variable opening and closing apparatus may include a housing including a plurality of compartmentalized opening portions, a plurality of flap units movably provided in each opening portion to open or close each opening portion according to their tilting positions when tilting in the housing, and a plurality of drive unit including a driver and an actuating member, wherein the actuating member is movably engaged to the housing and the flap unit is connected to the actuating member so that the tilting position of the flap unit switches in response to activation of the driver.

A lighting unit individually provided in each opening portion of the housing, configured to emit light toward the opening portion, and selectively turned on according to whether the opening portion is opened or closed by the flap unit is further included.

A plurality of flap units is arranged in the opening portion of the housing, and the lighting unit includes a plurality of LEDs that, respectively match each flap unit. The lighting unit features a plurality of lighting patterns in which the plurality of LEDs emits light sequentially, alternately, partially, or in full.

On the other hand, according to various exemplary embodiments of the present disclosure, an external variable opening and closing apparatus includes a housing including an opening portion, a flap unit including a panel portion and a moving shaft, wherein the panel portion opens or closes the opening portion according to the tilting position of the flap unit around the moving shaft, and a drive unit including a driver for generating power and an actuating member movably provided in the housing and including a plurality of guide holes with a straight or curved region, wherein the moving shaft of the flap unit is connected to the guide hole so that the tilting position of the flap unit switches when the driver is activated, in which the guide hole in the actuating member is divided into a maintenance region and a tilting region, and an opening and closing timing of the opening portion may be adjusted based on a length ratio or a shape of the maintenance region and the tilting region.

A plurality of flap units is arranged in the opening portion, the actuating member includes a plurality of guide holes for each flap unit to be connected thereto, and all guide holes have an equal length spanning from one end portion to the other end portion and encompass both the maintenance region and the tilting region.

The external variable opening and closing apparatus having the configuration described above controls the airflow rate passing through the grille and enhances the merchantability through the sophisticated opening and closing operations during airflow rate control.

In other words, diversified opening and closing operations of the grille such as sequential or simultaneous operations enhance the sophistication of the opening and closing operations of the grille, contribute to the diversification of external design, and secure the airflow rate through the optimized structural arrangements.

Furthermore, jams and malfunctions of parts are prevented during the opening and closing operations of the grille so that the reliability of the grille opening and closing operation improves.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
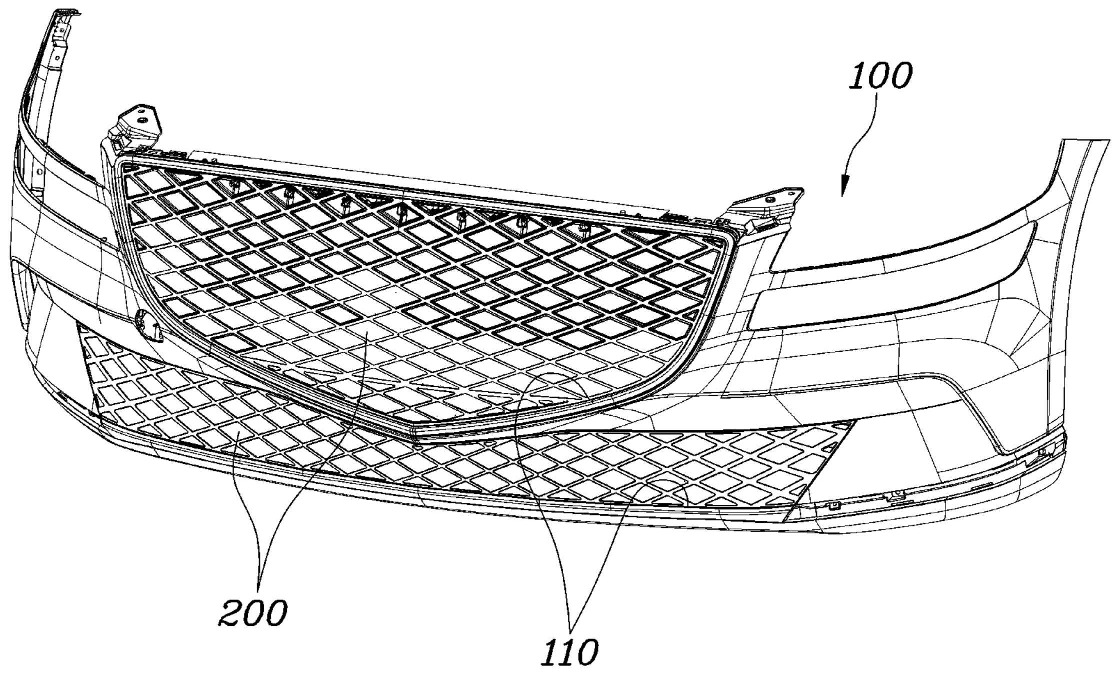
FIG. 1 is a view exemplarily illustrating an external variable opening and closing apparatus according to an exemplary embodiment of the present disclosure.
Figure 2:
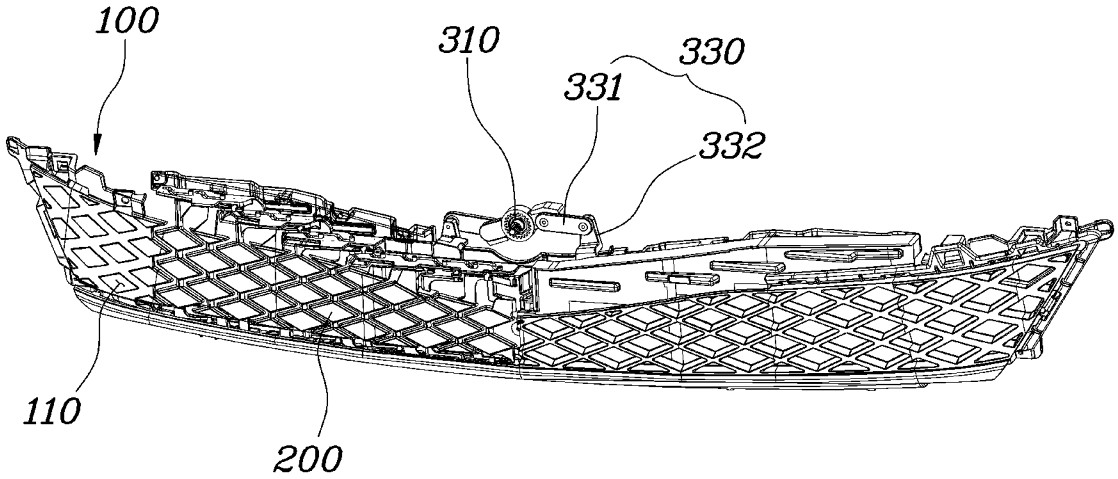
FIG. 2 is a view exemplarily illustrating a flat unit and a drive unit in the external variable opening and closing apparatus illustrated in FIG. 1.
Figure 3:
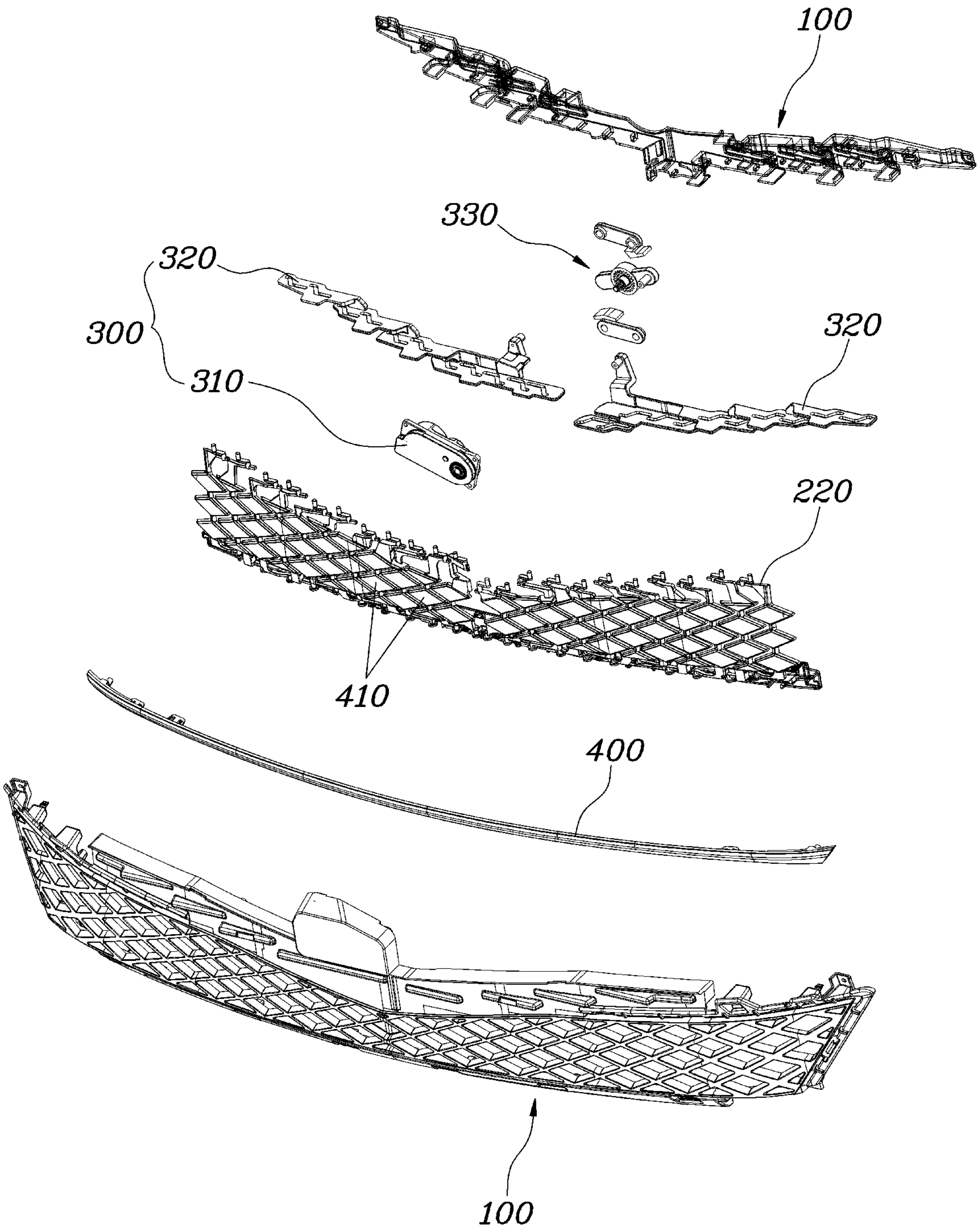
FIG. 3 is an assembly view of a flap unit and a drive unit in the external variable opening and closing apparatus illustrated in FIG. 1.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The embodiments included herein will be described in detail with reference to the accompanying drawings. However, the same or similar components will be given the same reference numerals regardless of the drawing numbers, and the repetitive descriptions regarding these components will be omitted.

When it is determined that the specific description of the related and already known technology may obscure the essence of the embodiments included herein, the specific description will be omitted. Furthermore, it is to be understood that the accompanying drawings are only intended to facilitate understanding of the embodiments included herein and are not intended to limit the technical ideas included herein are not limited to the accompanying drawings and include all the modifications, equivalents, or substitutions within the spirit and technical scope of the present disclosure.

The terms including ordinal numbers such as first, second, and the like may be used to describe various components, but the components are not to be limited by the terms. The terms may only be used for distinguishing one component from another.

It is to be understood that when a component is referred to as being "connected" or "coupled" to another component, the component may be directly connected or coupled to the another component, but other components may be interposed therebetween. In contrast, it is to be understood that when a component is referred to as being "directly connected" or "directly coupled" to another component, no other component is interposed therebetween.

Singular expressions include plural expressions unless the context explicitly indicates otherwise.

In the present specification, terms such as "comprise" or "have" are intended to indicate the presence of implemented features, numbers, steps, manipulations, components, parts, or combinations thereof described in the specification and are not to be understood to preclude the presence or additional possibilities of at least one of other features, numbers, steps, manipulations, components, parts or combinations thereof.

Furthermore, a unit or a control unit included in the names such as a motor control unit (MCU), a hybrid control unit (HCU), and the like is a term widely used in the naming of controllers that control specific functions of a vehicle and does not mean a generic function unit.

An external variable opening and closing apparatus according to exemplary embodiments of the present disclosure will be described below with reference to the accompanying drawings.

According to an exemplary embodiment of the present disclosure, an external variable opening and closing apparatus includes a housing 100 including an opening portion 110, a flap unit 200 provided in the opening portion 110 to open or close the opening portion 110 according to a tilting position thereof when tilting in the housing 100, and a drive unit 300 including a driver 310 and an actuating member 320, wherein the actuating member 320 is movably provided in the housing and the flap unit 200 is connected to the actuating member 320 so that the tilting position of the flap unit 200 switches according to whether the driver 320 is activated.

The housing 100 is provided on the front exterior of the mobility and may be configured with a grille. The housing 100 has openings in the fore-to-aft direction to allow airflow, and the image of the front exterior may be diversified through the switching operations of the flap unit 200 from the opening to closing and vice versa in the open space. Furthermore, the housing 100 may be separated into upper and lower portions to ensure assembly convenience.

The housing 100 is provided with the flap unit 200 and the drive unit 300. The flap unit 200 is moved or tilted by the drive unit 300 so that the opening portion 110 of the housing 100 is selectively opened or closed according to the movement or tilting position of the flap unit 200.

The drive unit 300 includes the driver 310 and the actuating member 320. The driver 310 is configured to generate power and the actuating member 320 is connected to the driver 310 and the flap unit 200 so that the flap unit 200 moves or its tilting position switches by the power of the driver 310.

As a result, the opening portion 110 of the grille is opened or closed by the flap unit 200 and the drive unit 300, allowing selective cooling and improvement of the aerodynamic performance of the powertrain and electrical components and enhancing the design and sophistication of the grille.

The present disclosure will be described in detail in the following. To facilitate understanding of the present disclosure, description will be based on the opening portion provided in the lower portion of the external variable opening and closing apparatus illustrated in FIG. 1.

The driver 310 may include a motor, and the operation of the driver 310 is determined by the control of a motor controller operatively connected to the motor.

The actuating member 320 is movably provided in the housing 100, is connected to the driver 310 and the flap unit 200, and moves in the housing 100 to switch the flap unit 200 to open or close the opening portion 110 when the driver 310 is activated.

As illustrated in FIG. 4, FIG. 5, FIG. 6, FIG. 7, FIG. 8, and FIG. 9, the actuating member 320 includes a plurality of guide holes H with a straight or curved region, and the flap unit 200 is connected to the guide hole H to move along the guide hole H.

The guide hole H in the actuating member 320 forms a moving path of the flap unit 200 so that the flap unit 200 moves or tilts along the guide hole H.

The driver 310 and the actuating member 320 are connected to each other through a link portion 330, the link portion 330 includes a driving link 331 and a driven link 332 rotatably connected to each other, and the driving link 331 may be connected to the driver 310 while the driven link 332 may be connected to the actuating member 320. As a result, when the driver 310 is activated, the flap unit 200 may move along the guide hole H by the movement of the actuating member 320 to switch between opening and closing operations.

In other words, the driver 310 generates rotation power, and the actuating member 320 to which the driver 310 is connected through the link portion 330 may undergo linear motion by the rotation motion of the link portion 330. Furthermore, while the driver 310 and the actuating member 320 may be directly connected, the link portion 330 allows the single driver 310 to operate a plurality of actuating members 320, and the link connection may reduce mechanical operation errors.

The link portion 330 includes the driving link 331 and the driven link 332 to move the actuating member 320 in connection with the rotation of the driving link 331 and the driven link 332 when the driver 310 is activated. In other words, the rotation of the driving link 331 connected to the driver 310 causes the driven link 332 to rotate and subsequently moves the actuating member 320.

The link portion 330 may be configured so that each link rotates in the lateral direction of the opening portion 110, and when the driver 310 is activated, the rotation of the driving link 331 and the driven link 332 moves the actuating member 320 in the lateral direction of the opening portion 110 so that the flap unit 200 may move or tilt along the guide hole H.

On the other hand, the flap unit 200 includes a panel portion 210 and a moving shaft 220, and the moving shaft 220 may be inserted into the guide hole H.

The panel portion 210 may have a certain area to allow the closing of the opening portion 110 of the housing 100 and may be formed in various shapes.

Furthermore, a plurality of panel portions 210 may be arranged on the moving shaft 220. In an exemplary embodiment of the present disclosure, the rhombus-shaped panel portions 210 are arranged along the moving shaft 220, and different panel portions 210 are disposed to overlap in the up-and-down direction partially.

One of the end portions of the moving shaft 220 of the flap unit 200 may be inserted into the guide hole H in the actuating member 320 while the other one may be rotatably connected to the housing 100.

The actuating member 320 may be movably provided on one side or the other side of the opening portion 110.

In an exemplary embodiment of the present disclosure, one side may be the upper side while the other side may be the lower side thereof. In the exemplary embodiment of the present disclosure, the actuating member 320 and the driver 310 are provided on one side, i.e., the upper side, of the opening portion 110.

One end portion of the moving shaft 220 of the flap unit 200 is inserted into the guide hole H in the actuating member 320 while the other end portion thereof is rotatably connected to the other side of the opening portion 110. As a result, the flap unit 200 may tilt in the opening portion 110 while provided in the housing 100 depending on whether the actuating member 320 operates.

Figure 6:
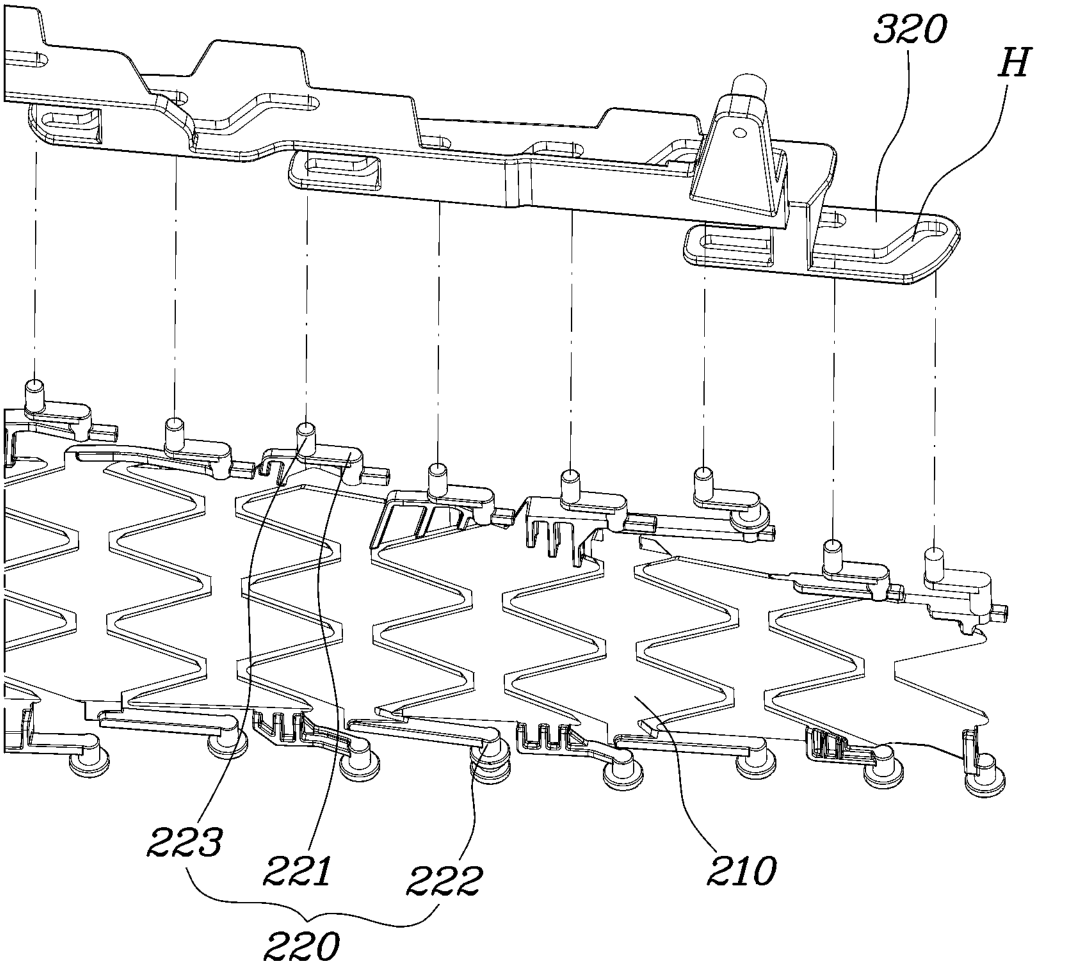
FIG. 6 is a view exemplarily illustrating the connection between a flap unit and an actuating member in the external variable opening and closing apparatus illustrated in FIG. 1.
Figure 7:
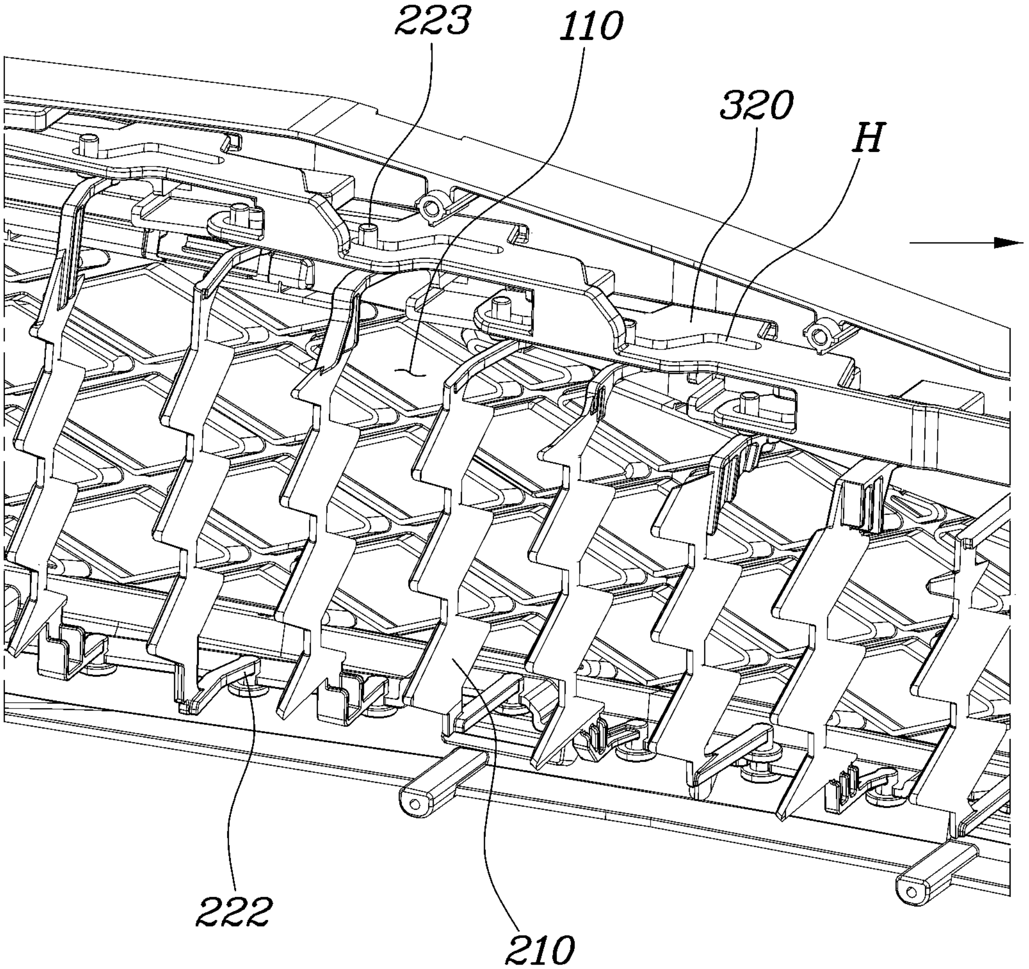
FIG. 7 is a view exemplarily illustrating a position switching of a flap unit by the operation of a drive unit in the external variable opening and closing apparatus illustrated in FIG. 1.

As illustrated in FIG. 6 and FIG. 7, the moving shaft 220 may include a first-side center shaft portion 221 and the-second-side center shaft portion 222 spaced apart across the opening portion 110 and rotatably connected to the housing 100, and a rotating shaft portion 223 spaced apart in the orthogonal direction from the first-side center shaft portion 221 or the-second-side center shaft portion 222 and inserted into the guide hole H.

The moving shaft 220 is configured to perform the rotation operation in connection with the movement of the actuating member 320 while rotatably provided in the housing 100. The moving shaft 220 includes a first-side center shaft portion 221 and the-second-side center shaft portion 222 on one side and the other side respectively so that each center shaft portion is rotatably provided in the housing 100. The first-side center shaft portion 221 and the-second-side center shaft portion 222 are disposed in vertical alignment so that the moving shaft 220 may tilt with respect to each center shaft portion.

The moving shaft 220 includes the rotating shaft portion 223 spaced apart in the orthogonal direction from the first-side center shaft portion 221 or the-second-side center shaft portion 222 and inserted into the guide hole H. In an exemplary embodiment of the present disclosure, the moving shaft 220 may include the rotating shaft portion 223 spaced from the first-side center shaft portion 221.

The rotating shaft portion 223 is spaced from the first-side center shaft portion 221 and inserted into the guide hole H in the actuating member 320 so that the moving shaft 220 rotates as the rotating shaft portion 223 moves along the moving path of the guide hole H when the actuating member 320 moves. In other words, each center shaft portion is configured as a fixed rotating shaft in the moving shaft 220 and the rotating shaft portion 223 rotates along the guide hole H in the actuating member 320 to perform the tilting operation.

Here, the panel portion 210 is connected to the first-side center shaft portion 221 and the-second-side center shaft portion 222 and is disposed in an orthogonal direction at a distance from the point where each respective center shaft portion is connected to the housing so that the panel portion 210 moves along the rotation radius when the moving shaft 220 tilts. In other words, when the panel portion 210 is aligned with the respective center shaft portions, the panel portion 210 will rotate in place even when the moving shaft 220 rotates. In an exemplary embodiment of the present disclosure, the panel portion 210 is connected to each center shaft portion but is disposed at a distance from each center shaft so that the panel portion 210 may move along the rotation radius when the moving shaft 220 rotates.

Here, the guide hole H in the actuating member 320 includes a maintenance region H1 and a tilting region H2, and the maintenance region H1 extends linearly in the moving direction of the actuating member 320 while the tilting region H2 extends diagonally from the maintenance region H1.

In the present way, the guide hole H includes the maintenance region H1 and the tilting region H2 connected to each other. Because the maintenance region H1 extends linearly in the moving direction of the actuating member 320, the position of the moving shaft 220 is maintained even when the actuating member 320 moves. The tilting region H2 extends diagonally from the maintenance region H1 so that the moving shaft 220 is induced to tilt when the actuating member 320 moves.

In the present way, the rotating shaft portion 223 of the moving shaft 220 is inserted into the guide hole H, and the rotating shaft portion 223 moves in the maintenance region H1 and the tilting region H2 of the guide hole H when the actuating member 320 moves. As a result, once the rotating shaft portion 223 enters the tilting region H2, the moving shaft 220 may perform the tilting operation with respect to each center shaft portion as the rotating shaft portion 223 moves in the tilting region H2.

On the other hand, guide holes H in the actuating member 320 have an equal length spanning from one end portion to the other end portion and the position, angle, or shape of the tilting region is either the same across the guide holes or at least one of these features may differ.

Figure 8:
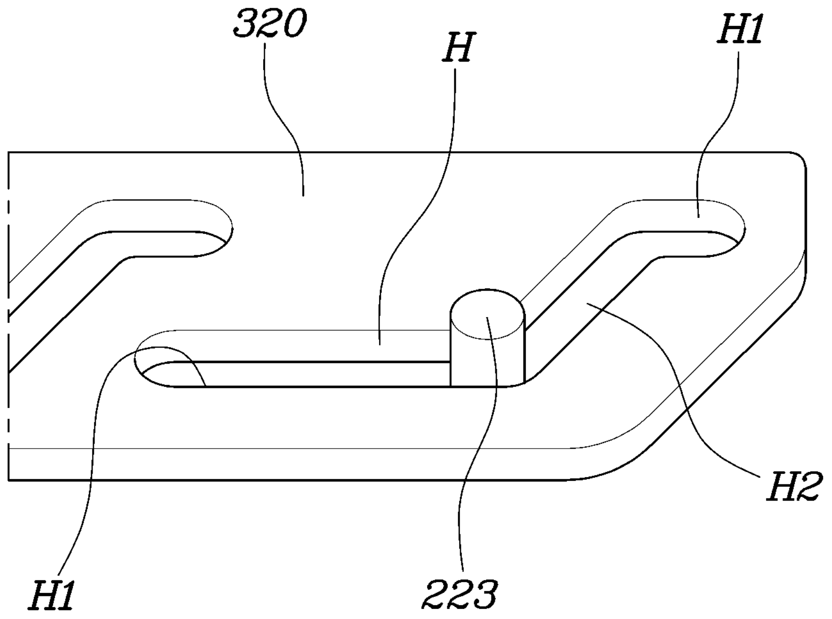
FIG. 8 is a view exemplarily illustrating a guide hole in an actuating member according to an exemplary embodiment of the present disclosure.
Figure 9:
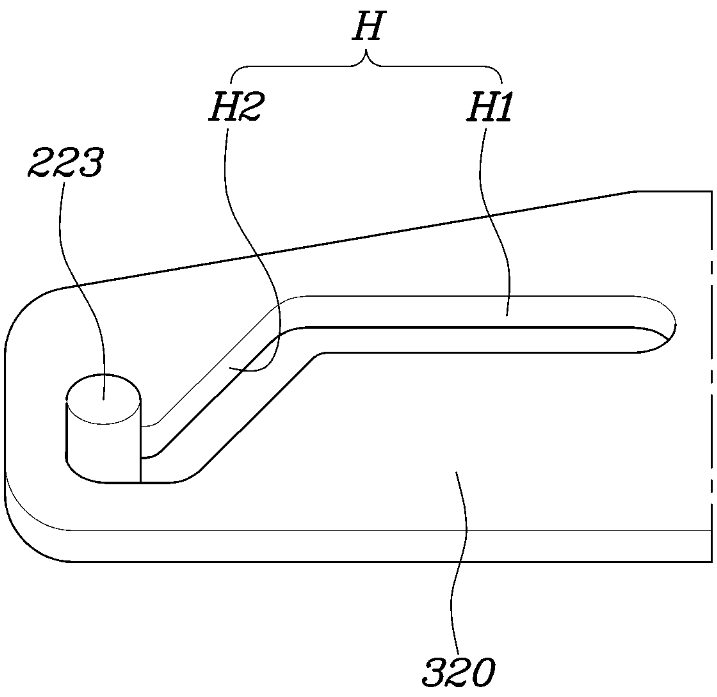
FIG. 9 is a view exemplarily illustrating a guide hole in an actuating member according to another exemplary embodiment of the present disclosure.

As illustrated in FIG. 8 and FIG. 9, the actuating member 320 includes a plurality of guide holes H for each flap unit 200 and has an equal length spanning from one end portion to the other. As a result, a plurality of flap units 200 may operate in the same operation range when the actuating member 320 moves by the activation of the driver 310.

Furthermore, the tilting region H2 may be disposed at the same or different positions in respective guide holes H of equal length. In other words, when the tilting region H2 is disposed at the same position for the respective guide holes H, each flap unit 200 connected to the guide holes H with the same moving path may operate with the same tilting timing.

Furthermore, when a plurality of guide holes H has different tilting regions H2, each flap unit 200 may operate with different tilting timings.

As a result, the tilting timing of a plurality of flap units 200 may be adjusted by the shape of each guide hole H in the actuating member 320 so that the operation of the flap unit 200 may be diversified.

According to an exemplary embodiment of the present disclosure, the tilting region H2 may be disposed at a greater distance outward or inward as the respective guide hole is positioned farther away from the center portion of the opening portion 110.

Figure 10:
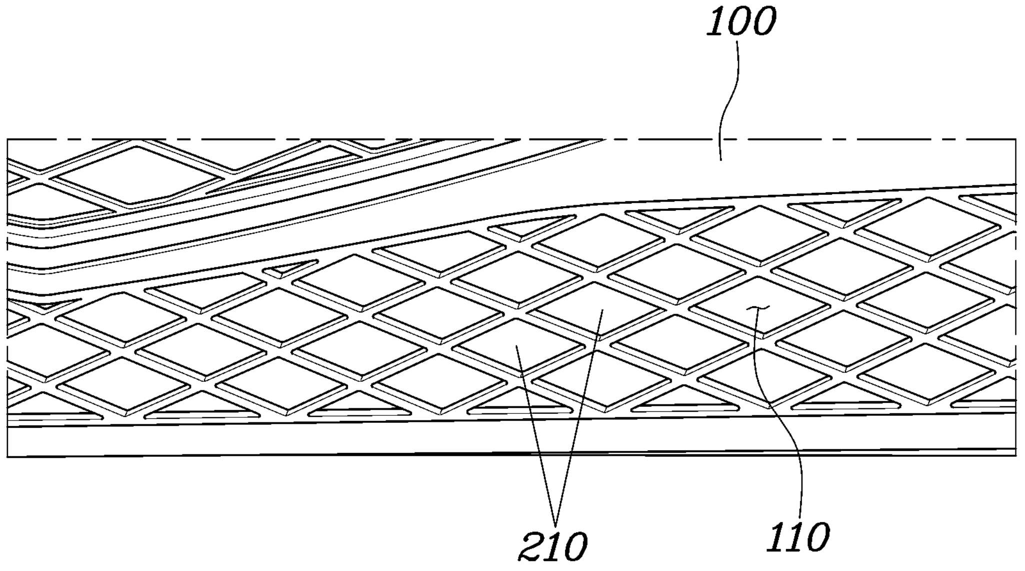
FIG. 10 is a view exemplarily illustrating a closed state of an external variable opening and closing apparatus according to an exemplary embodiment of the present disclosure.
Figure 11:
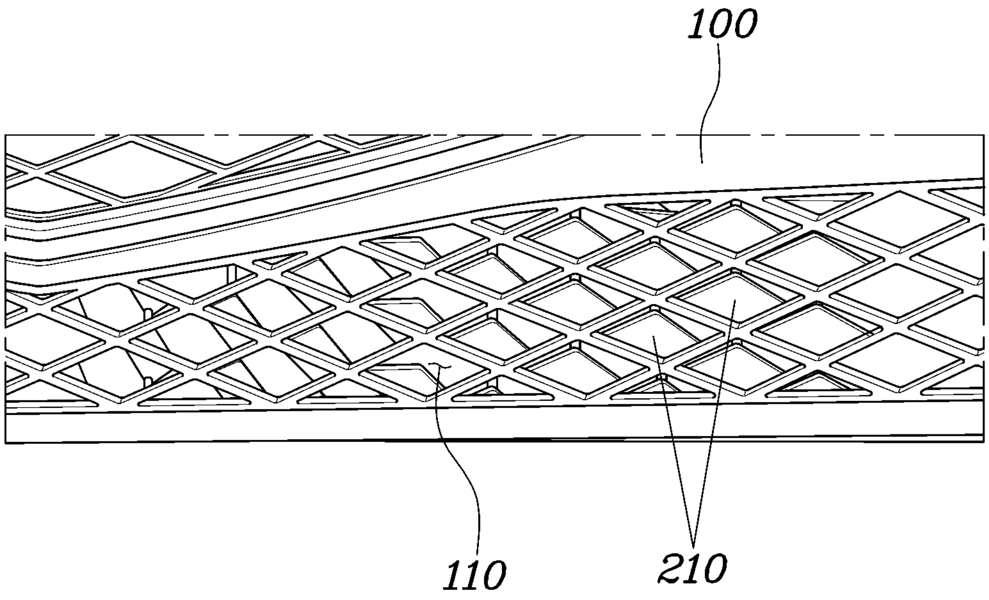
FIG. 11 is a view exemplarily illustrating an opening operation of an external variable opening and closing apparatus according to an exemplary embodiment of the present disclosure.
Figure 12:
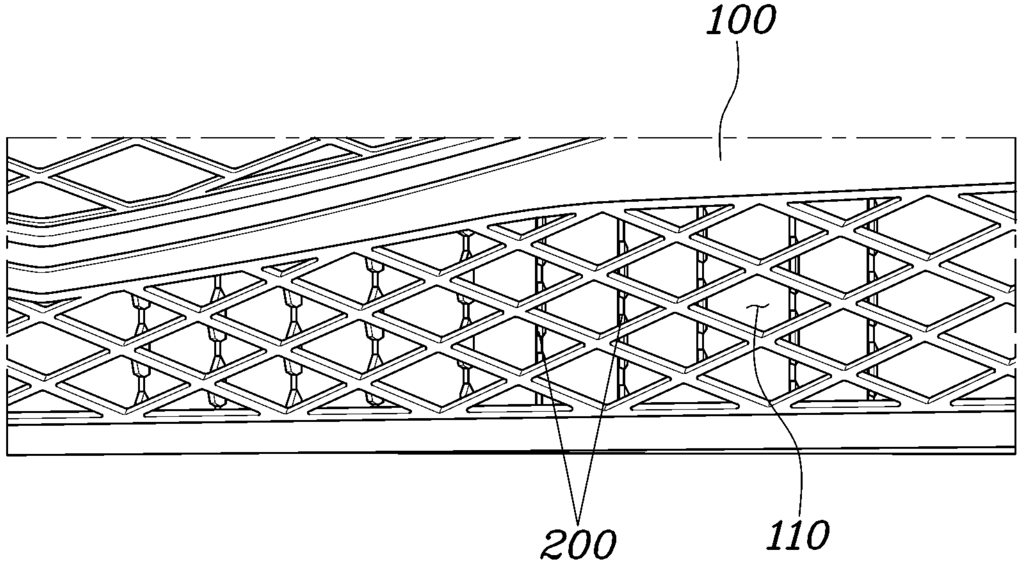
FIG. 12 is a view exemplarily illustrating an open state of an external variable opening and closing apparatus according to an exemplary embodiment of the present disclosure.

For example, when the tilting regions H2 are disposed at a greater distance outward as the respective guide hole H is positioned farther away from the center portion of the opening portion 110, a plurality of flap units 200 sequentially opens or closes the opening portion as illustrated in FIG. 11 when the actuating member 320 moves by the activation of the driver 310 while the plurality of flap units 200 closes the opening portion as illustrated in FIG. 10, and each flap unit 200 may switch to the open state as illustrated in FIG. 12.

In an exemplary embodiment of the present disclosure, the tilting region H2 position of the guide hole H is designed in various ways in the actuating member 320 so that the tilting timing of the flap unit 200 may be diversified, and thus the sophisticated implementation of the opening and closing operations of the flap unit 200 is made possible.

On the other hand, the actuating members 320 and the flap units 200 are divided into groups, and the actuating member in each group is connected to a single driver 310 to operate simultaneously.

For example, the actuating members 320 and the flap units 200 are grouped on either side of the opening portion 110 of the housing 100. The driver 310, positioned at the center portion of the opening portion 110, is connected to a plurality of actuating members 320 and may move the positions of each actuating member 320 simultaneously. As a result, a plurality of actuating members 320 is operated with a single driver 310 so that the manufacturing cost may be reduced and the structure may be simplified by reducing the number of components.

The actuating members 320 and flap units 200 are configured as a pair of groups disposed on either side of the opening portion 110, and the driver 300 further includes a pair of link portions 330 connected to the actuating member 320 in each group so that the pair of link portions 330 may be connected to a single driver 310.

Figure 4:
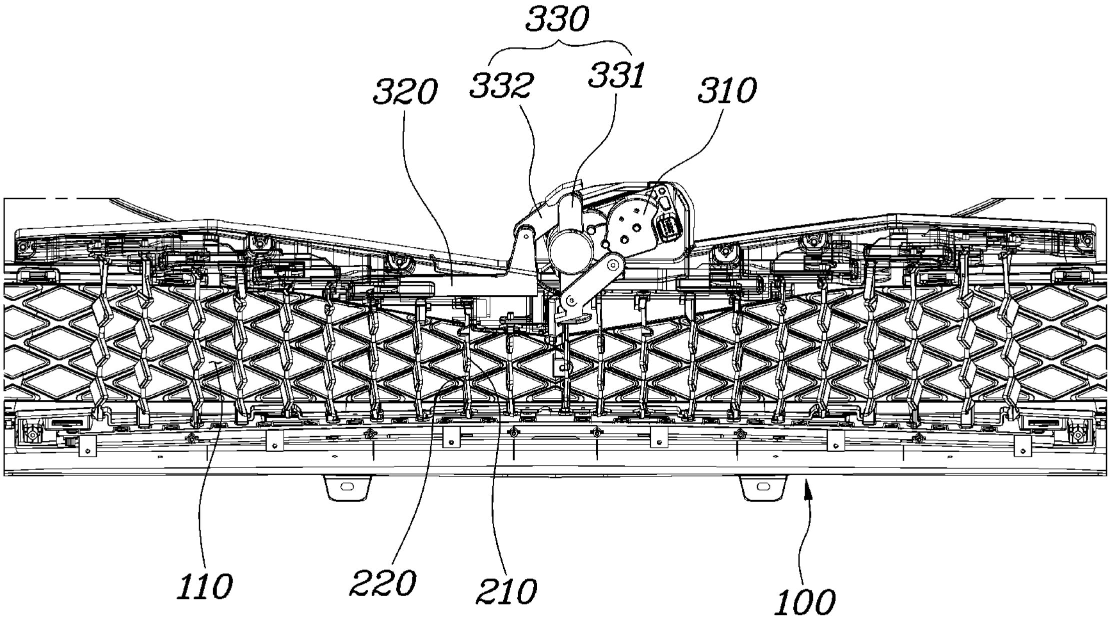
FIG. 4 is a view exemplarily illustrating the connection between a flap unit and a drive unit in the external variable opening and closing apparatus illustrated in FIG. 1.
Figure 5:
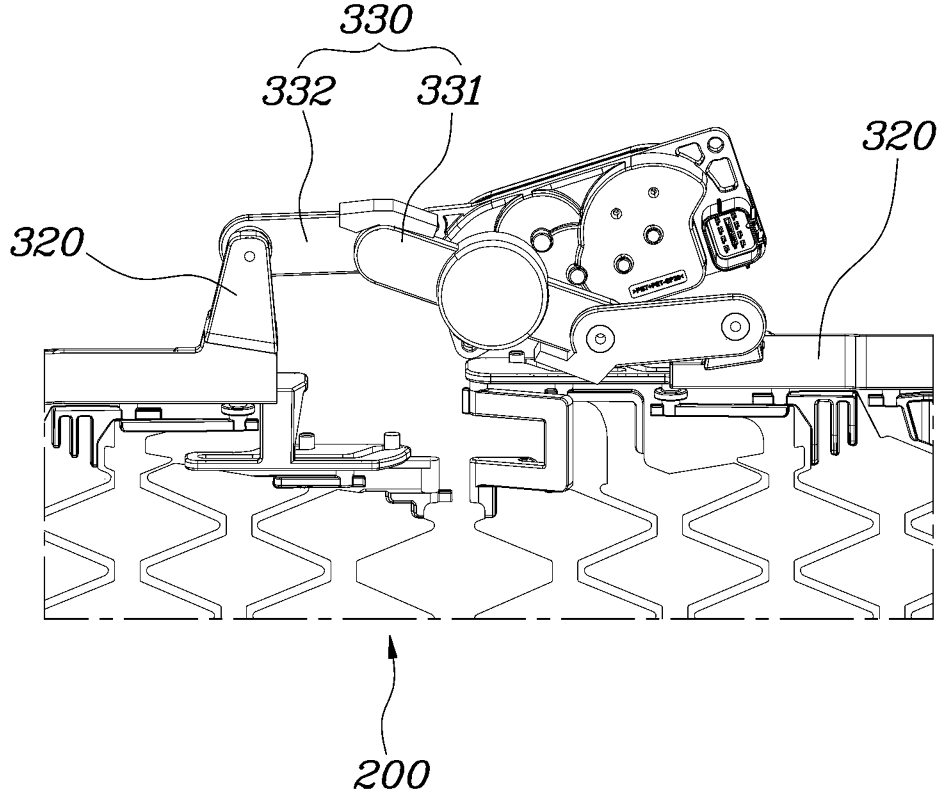
FIG. 5 is a view exemplarily illustrating a drive unit of the external variable opening and closing apparatus illustrated in FIG. 1.

For example, FIG. 4 and FIG. 5 show that a plurality of actuating members 320 and flap units 200 are divided into a right group and a left group from the center portion of the opening portion 110 of the housing 100. The shape of the guide hole H formed in the actuating member 320 in the left group and the shape of the guide hole H formed in the actuating member 320 in the right group are made different so that the opening and closing operations for the plurality of flap units 200 in the opening portion 110 are implemented differently for each group and thus the opening and closing operations of the flap unit 200 are sophisticated and the merchantability improves.

Furthermore, the position of the flap unit 200 positioned at the center portion of the opening portion 110 of the housing 100 may be fixed separately from the right and left groups, which helps divide the flap units 200 into the right and left groups and provides a sense of design stability.

On the other hand, a lighting unit 400 provided in the housing 100, configured to emit light toward the opening portion 110, and selectively turned on according to whether the opening portion 110 is opened or closed by the flap unit 200 may be further included.

The lighting unit 400 may include a plurality of LEDs and be disposed behind the flap unit 200 in the housing 100. As a result, the lighting unit 400 may be used to foster a sense of sophistication or communicate with the outside by emitting light when the flap unit 200 opens or closes the opening portion 110.

Figure 13:
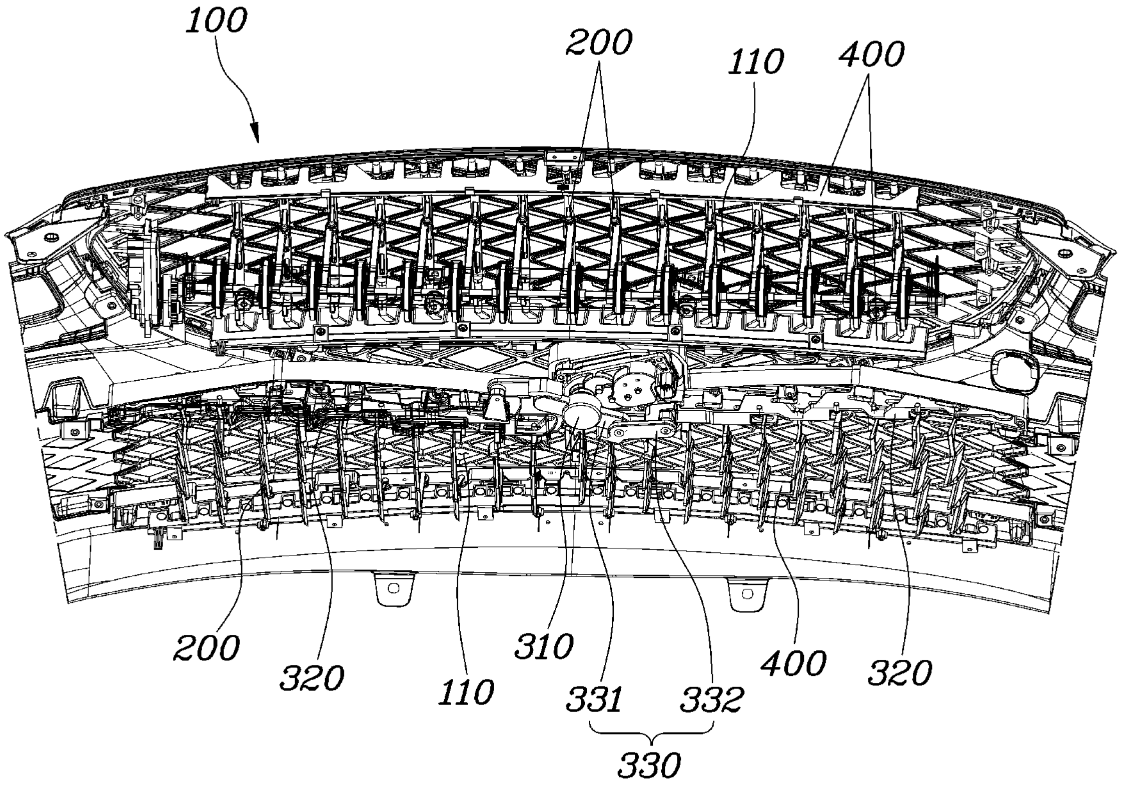
FIG. 13 is a view exemplarily illustrating an external variable opening and closing apparatus according to another exemplary embodiment of the present disclosure.

On the other hand, according to another exemplary embodiment of the present disclosure, as illustrated in FIG. 13, an external variable opening and closing apparatus may include a housing 100 including a plurality of compartmentalized opening portions, a plurality of flap units 200 movably provided in each opening portion 110 to open or close each opening portion 110 according to their tilting positions when tilting in the housing 100, and a plurality of drive units 300 including a driver 310 and an actuating member 320, wherein the actuating member 320 is movably provided in the housing 100 and the flap unit 200 is connected to the actuating member 320 so that the tilting position of the flap unit 200 switches according to whether the driver 310 is activated.

For example, as illustrated in FIG. 1, the opening portion 110 of the housing 100 may include separated upper and lower portions, and each opening portion 110 may include the flap unit 200 and drive unit 300 respectively.

A plurality of opening portions 110 is separately provided in the housing 100 and the flap unit 200 and drive unit 300 are respectively provided in each opening portion 110 so that each opening portion 110 may be individually controlled for opening and closing. Furthermore, distinct designs and operational characteristics may be implemented for each opening portion 110 by applying different designs for each opening portion 110 and different designs for the flap units 200 in the housing 100.

Here, the lighting unit 400 individually provided in each opening portion 110 of the housing 100, configured to emit light toward the opening portion 110, and selectively turned on according to whether the opening portion 110 is opened or closed by the flap unit 200 may be further included.

The lighting unit 400 may include a plurality of LEDs and be disposed behind the flap unit 200 in the housing 100. As a result, the lighting unit 400 may be used to foster a sense of sophistication or communicate with the outside by emitting light when the flap unit 200 opens or closes the opening portion 110.

Furthermore, the opening portion 110 of the housing 100 may include a plurality of flap units 200 arranged laterally, and the lighting unit 400 may include a plurality of LEDs respectively matching each flap unit 200.

In an exemplary embodiment of the present disclosure, the flap units 200 are arranged laterally in the opening portion 110 and include a pattern of a predetermined shape. The lighting unit 400 includes a plurality of LEDs to emit light on each flap unit 200 and is provided around the opening portion 110 to emit light through the opening portion 110. As a result, the lighting unit 400 may emit light on each flap unit 200 and implement diverse lighting effects by controlling the color of each light-emitting diode (LED) and the lighting timing of each LED.

In other words, the lighting unit 400 may feature a plurality of lighting patterns in which a plurality of LEDs emits light sequentially, alternately, partially, or in full. Because the lighting unit 400 features a plurality of lighting patterns in the present manner, the lighting unit 400 may implement lighting images synchronized with the opening and closing operations of the flap unit 200 as well as various situation-specific lighting patterns, incorporating communication functions such as turn signals and warning signals as well as battery charging check function.

The lighting unit 400 may be turned on when the flap unit 200 is positioned to open the opening portion 110 and be turned off when the flap unit 200 is positioned to close the opening portion 110.

In other words, the operation of the lighting unit 400 may be determined by the control of a controller. The lighting unit 400 may be turned on to emit light on the flap unit 200 that switches to an opening operation and be turned off when the flap unit 200 switches to a closing operation to close the opening portion 110.

Various lighting images such as welcome mode, goodbye mode, night driving mode, communication mode, charging mode, and the like may be implemented to enhance the sophistication and merchantability by controlling the selective lighting operations of the lighting unit 400.

Figure 14:
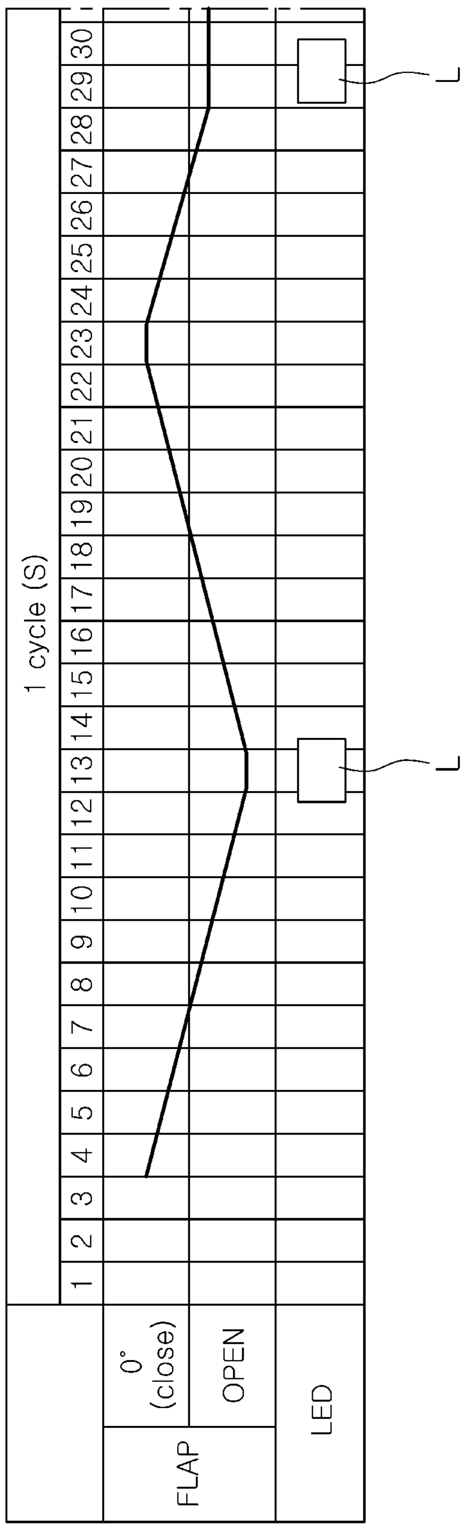
FIG. 14 is a view for describing the operation of a lighting unit in an external variable opening and closing apparatus according to an exemplary embodiment of the present disclosure.

In an exemplary embodiment of the present disclosure, as illustrated in FIG. 14, in performing opening or closing operation of the flap unit 200 over time, the light-emitting diode (LED) of the lighting unit 400 may be turned on to emit light in certain lighting sections L in a process of sequentially opening the flap units 200.

In the present way, the external images may be diversified and various situations may be handled by controlling the timing of opening or closing operation and operation time of the flap unit 200, the lighting timing of the LEDs of the lighting unit 400, and the like.

On the other hand, according to an exemplary embodiment of the present disclosure, an external variable opening and closing apparatus includes a housing 100 including an opening portion 110, a flap unit 200 including a panel portion 210 and a moving shaft 220, wherein the panel portion 210 opens or closes the opening portion 110 according to a tilting position of the flap unit 200 around the moving shaft 220, and a drive unit 300 including a driver 310 for generating power and an actuating member 320 movably provided in the housing 100 and including a plurality of guide holes H with a straight or curved region, wherein the moving shaft 220 of the flap unit 200 is connected to the guide hole H so that the tilting position of the flap unit 200 switches when the driver 310 is activated, in which the guide hole H in the actuating member 320 includes a maintenance region H1 and a tilting region H2, and the opening and closing timing of the opening portion 110 may be adjusted based on the length ratio or shape of the maintenance region H1 and the tilting region H2.

Here, the maintenance region H1 may extend linearly in the moving direction of the actuating member 320 while the tilting region H2 may extend diagonally from the maintenance region H1.

A plurality of flap units 200 may be arranged in the opening portion 110, the actuating member 320 may include a plurality of guide holes H for each flap unit 200 to be connected thereto, and all guide hole H may have an equal length and encompass both the maintenance region H1 and the tilting region H2.

The moving shaft 220 in the flap unit 200 is inserted into the guide hole H in the present way, and the moving shaft 220 moves in the maintenance region H1 and the tilting region H2 when the actuating member 320 moves. As a result, once the moving shaft 220 enters the tilting region H2, the flap unit 200 may perform the tilting operation as the moving shaft 220 moves in the tilting region H2.

On the other hand, the guide holes H in the actuating member 320 have an equal length spanning from one end portion to the other, and the position, angle, or shape of the tilting region are either the same across the guide holes or at least one of these features may differ.

A plurality of guide holes H in the actuating member 320 is provided for each flap unit 200 and all guide holes H have an equal length spanning from one end portion to the other. As a result, a plurality of flap units 200 may operate in the same operation range when the actuating member 320 moves by the operation of the driver 310.

Furthermore, the tilting region H2 may be disposed at the same or different positions in the respective guide holes H of equal length. In other words, when the tilting region H2 is disposed at the same position for the respective guide holes H, each flap unit 200 connected to the guide holes H with the same moving path may operate with the same tilting timing. Furthermore, when a plurality of guide holes H has different tilting regions H2, each flap unit 200 may operate with different tilting timings.

As a result, the tilting timings of a plurality of flap units 200 may be adjusted by the shape of each guide hole H in the actuating member 320 so that the operation of the flap unit 200 may be diversified.

The external variable opening and closing apparatus including a structure as described above is configured to control the airflow rate passing through the grille and enhances merchantability through sophisticated opening and closing operations during airflow rate control.

In other words, diversified opening and closing operations of the grille such as sequential or simultaneous operations enhance the sophistication of the opening and closing operations of the grille, contribute to the diversification of external design, and secure the airflow rate through the optimized structural arrangements.

Furthermore, jams and malfunctions of parts are prevented during the opening and closing operations of the grille so that the reliability of the grille opening and closing operation improves.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured for processing data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the memory and the processor may be provided as one chip, or provided as separate chips.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

In an exemplary embodiment of the present disclosure, the vehicle may be referred to as being based on a concept including various means of transportation. In some cases, the vehicle may be interpreted as being based on a concept including not only various means of land transportation, such as cars, motorcycles, trucks, and buses, that drive on roads but also various means of transportation such as airplanes, drones, ships, etc.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

According to an exemplary embodiment of the present disclosure, components may be combined with each other to be implemented as one, or some components may be omitted.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An external variable opening and closing apparatus comprising:

a housing including an opening portion;

a flap unit provided in the opening portion to open or close the opening portion according to a tilting position of the flap unit in tilting in the housing; and a drive unit including a driver and an actuating member, wherein the actuating member is movably engaged to the housing and the flap unit is connected to the actuating member so that the tilting position of the flap unit switches in response to activation of the driver, wherein the flap unit includes a panel portion, and wherein the panel portion is offset from a pivot point connected to the housing such that the panel portion translates along a rotation radius about the pivot point during tilting.

2. The apparatus of claim 1, wherein a plurality of guide holes with include a straight or curved region, and wherein the flap unit is connected to the guide holes to move along the guide hole holes.

3. The apparatus of claim 2, wherein the driver and the actuating member are connected through a link portion, and wherein the link portion includes a driving link and a driven link rotatably connected to each other, and wherein the driving link is connected to the driver and the driven link is connected to the actuating member.

4. The apparatus of claim 2, wherein the flap unit further includes a moving shaft, and wherein the moving shaft is inserted into the guide holes.

5. The apparatus of claim 4, wherein a first end portion of end portions of the moving shaft of the flap unit is inserted into the guide hole in the actuating member and a second end portion thereof is rotatably connected to the housing.

6. The apparatus of claim 4, wherein the moving shaft includes:

a first-side center shaft portion and a second-side center shaft portion spaced apart across the opening portion and rotatably connected to the housing; and a rotating shaft portion spaced apart in an orthogonal direction from the first-side center shaft portion or the second-side center shaft portion and inserted into the guide holes.

7. The apparatus of claim 6, wherein the panel portion is connected to the first-side center shaft portion and the second-side center shaft portion and disposed in an orthogonal direction at a distance from a point where each center shaft portion is connected to the housing.

8. The apparatus of claim 2, wherein the guide holes in the actuating member include a maintenance region and a tilting region, and wherein the maintenance region extends linearly in a moving direction of the actuating member and the tilting region extends diagonally from the maintenance region.

9. The apparatus of claim 8, wherein position, angle, or shape of the tilting region are either a same across the guide holes or at least one of the position, angle, or shape differs.

10. The apparatus of claim 9, wherein the tilting region is disposed at a greater distance outward or inward as the guide holes are positioned farther away from a center portion of the opening portion.

11. The apparatus of claim 2, wherein the actuating member is in plural and the flap unit is in plural, and wherein the actuating members and the flap units are divided into groups, and actuating members in each group is connected to a single driver to operate simultaneously.

12. The apparatus of claim 11, wherein the actuating members and the flap units are configured as a pair of groups disposed on either side of the opening portion, and wherein the drive unit further includes a pair of link portions connected to the actuating members in each group, wherein the pair of link portions is connected to the single driver.

13. The apparatus of claim 1, further including a lighting unit provided in the housing, configured to emit light toward the opening portion, and selectively turned on in response that the opening portion is opened or closed by the flap unit.

14. An external variable opening and closing apparatus comprising:

a housing including a plurality of opening portions;

a plurality of flap units movably provided in each opening portion to open or close each opening portion according to tilting positions of the flap units in tilting in the housing; and a plurality of drive units, each drive unit including a driver and an actuating member, wherein the actuating member is movably engaged to the housing and each flap unit is connected to the actuating member so that the tilting positions of the flap units switches switch in response to activation of the driver, wherein the actuating member includes a plurality of guide holes, wherein each of the plurality of flap units includes a panel portion and a moving shaft, wherein the moving shaft includes:

a first-side center shaft portion and a second-side center shaft portion spaced apart across the opening portion and rotatably connected to the housing; and a rotating shaft portion spaced apart in an orthogonal direction from the first-side center shaft portion or the second-side center shaft portion and inserted into the guide holes, wherein the panel portion is connected to the first-side center shaft portion and the second-side center shaft portion and disposed in an orthogonal direction at a distance from a point where each center shaft portion is connected to the housing.

15. The apparatus of claim 14, further including a lighting unit individually provided in each opening portion of the housing, configured to emit light toward each opening portion, and selectively turned on in response that the opening portions are opened or closed by the flap units.

16. The apparatus of claim 15, wherein the plurality of flap units is arranged in the opening portions of the housing, and wherein the lighting unit includes a plurality of LEDs respectively matching each flap unit.

17. The apparatus of claim 16, wherein the lighting unit includes a plurality of lighting patterns, in which the plurality of LEDs emit light sequentially, alternately, partially, or in full.

18. The apparatus of claim 14, wherein the rotating shaft portion is connected to a connecting portion extending from the first-side center shaft portion in the orthogonal direction.

19. An external variable opening and closing apparatus comprising:

a housing including an opening portion;

a flap unit including a panel portion and a moving shaft, wherein the panel portion opens or closes the opening portion according to a tilting position of the flap unit around the moving shaft; and a drive unit including a driver for generating power and an actuating member movably provided in the housing and including a plurality of guide holes with a straight or curved region, wherein the moving shaft of the flap unit is connected to the guide holes so that the tilting position of the flap unit switches in response to activation of the driver, wherein the guide holes in the actuating member include a maintenance region and a tilting region, and wherein an opening and closing timing of the opening portion is adjusted based on a length ratio or a shape of the maintenance region and the tilting region, wherein the moving shaft includes:

a first-side center shaft portion and a second-side center shaft portion spaced apart across the opening portion and rotatably connected to the housing; and a rotating shaft portion spaced apart in an orthogonal direction from the first-side center shaft portion or the second-side center shaft portion and inserted into the guide holes, wherein the panel portion is connected to the first-side center shaft portion and the second-side center shaft portion and disposed in an orthogonal direction at a distance from a point where each center shaft portion is connected to the housing.

20. The apparatus of claim 19, wherein a plurality of flap units is arranged in the opening portion, wherein the actuating member includes the plurality of guide holes for each flap unit to be connected thereto, and wherein all guide holes include an equal length spanning from a first end portion to a second end portion and encompass the maintenance region and the tilting region.

* * * * *